United States Patent
Vissers

[15] 3,657,785
[45] Apr. 25, 1972

[54] APPARATUS FOR ATTACHING PROJECTING MEMBERS IN A HOLLOW SUPPORT OF AN AGRICULTURAL IMPLEMENT

[72] Inventor: Herbert Vissers, Nieuw-Vennep, Netherlands

[73] Assignee: H. Vissers N.V., Rotterdam, Netherlands

[22] Filed: Jan. 23, 1970

[21] Appl. No.: 5,184

[30] Foreign Application Priority Data

Feb. 3, 1969  Netherlands..........................6901675

[52] U.S. Cl..............................29/200 B, 29/148.3, 172/762
[51] Int. Cl. .....................................B23p 19/00, B21k 19/00
[58] Field of Search................29/200 B, 148.3, 200 J, 200 P, 29/208 D; 172/762

[56] References Cited

UNITED STATES PATENTS 3,325,879  6/1967  Morkoski..............................29/148.3
3,513,525  5/1970  Flackbarth et al. ..................29/200 B

*Primary Examiner*—Thomas H. Eager
*Attorney*—Imirie, Smiley, Snyder and Butrum

[57] ABSTRACT

Apparatus for forming a support assembly for tines or the like comprises a retaining member which is inserted within a hollow support member to hold a series of brushes between the opposite walls of the support member and properly to orient them with respect to aligned pairs of facing deforming tools. The tools are actuated to cut apertures in the walls concentrically of the bushes and then to deform the edges of the walls around these apertures inwardly within the bushes so that the bushes are retained between the walls.

4 Claims, 8 Drawing Figures

PATENTED APR 25 1972 3,657,785

INVENTOR
HERBERT VISSERS

BY
ATTORNEY

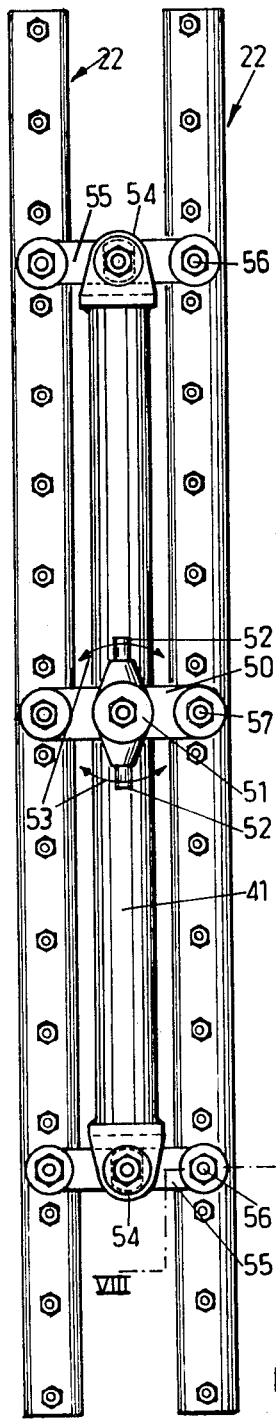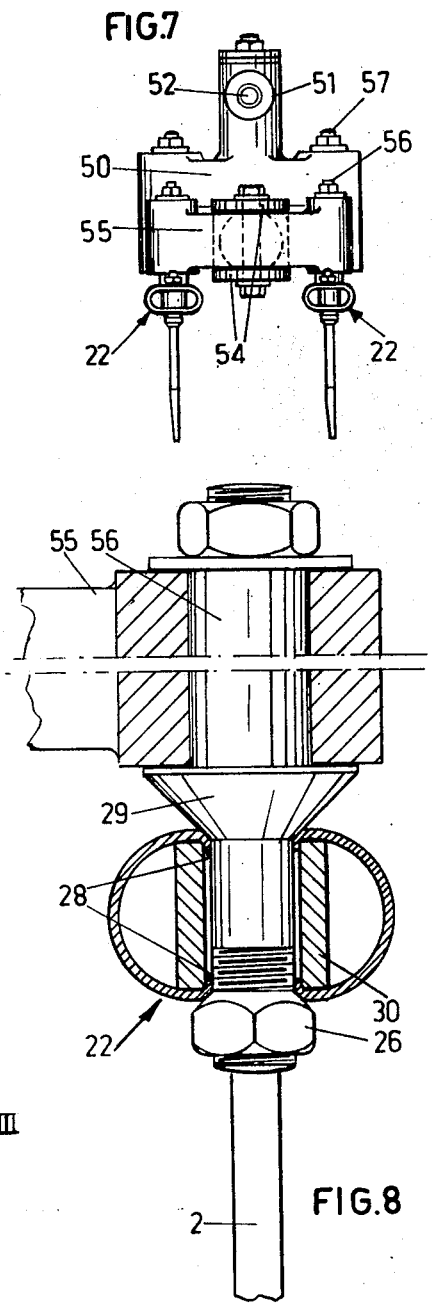

APPARATUS FOR ATTACHING PROJECTING MEMBERS IN A HOLLOW SUPPORT OF AN AGRICULTURAL IMPLEMENT

The invention relates to an apparatus for attaching at least one projecting member to a hollow support of an agricultural implement, said member extending through an aperture in each of two opposite walls of said support.

Attachments of the kind specified are used a great deal in agricultural implements, for instance for attaching tines to a harrow beam or to a rake bar, or for attaching the ejectors to the support of a digger machine, for attaching spikes to a rack of a beet-lifting machine, etc.

The invention has the object to provide a simple apparatus for making a firm attachment.

The invention has the object to provide an apparatus comprising means for retaining at least one bush in place between the opposite walls of said hollow support which walls each one provided with an aperture, and comprising at least one pair of aligned facing deforming tools for inward deformation of the edges of said said walls defining the two opposite apertures.

These and other features of the invention will be clearly gathered from the following description of a preferred embodiment of a method and apparatus for making the attachment according to the invention.

In the drawings:

FIGS. 6 and 7 are a plan view and side elevation respectively of a portion of a harrow with harrow beams as illustrated in FIGS. 1 and 2, and FIG. 8 is a partial section, to an enlarged scale, taken on the line VIII—VIII in FIG. 6.

Figure 1:
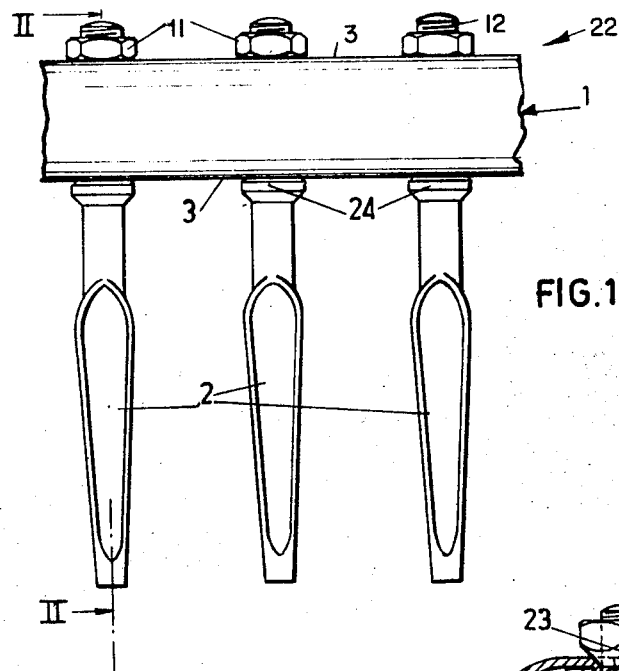
FIG. 1 is a front elevation of a harrow beam in which tines are attached by attachments according to the invention.
Figure 2:
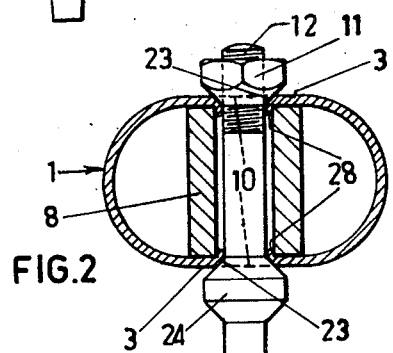
FIG. 2 is a section, to an enlarged scale, taken on the line II—II in FIG. 1.

Referring to FIGS. 1 and 2, a harrow beam consists of a flattened tubular support 1 to which tines 2 are attached by attachments according to the invention. These attachments comprise bushes 8 through which the tines 2 extend. These bushes 8 are arranged in the support 1 in a special manner which will be described hereinafter.

Of a harrow frame to be suspended from a tractor, FIGS. 6 and 7 show only a transverse girder 41 with U-shaped bearing members 54 on which levers 55 are pivotably mounted which hinge around pins 56 of harrow beams 22. Mounted in the transverse girder 41 is a crank 51 having pins 52 with which a driving mechanism (not shown) engages to drive the crank 51 oscillatably in the direction indicated by arrows 53, the crank 51 engaging via crank arms 50 with pins 57 of the harrow beams 22.

Each pin 56, 57 is firmly attached in the support 1, by extending through the hollow support 1 and a bush 39 firmly retained therein by edges 28, and by the support 1 also being clamped between a conical knob 29 and a conical nut 26. The lever 58 is hingeably connected between the knob 29 and a nut 26.

Figure 3:
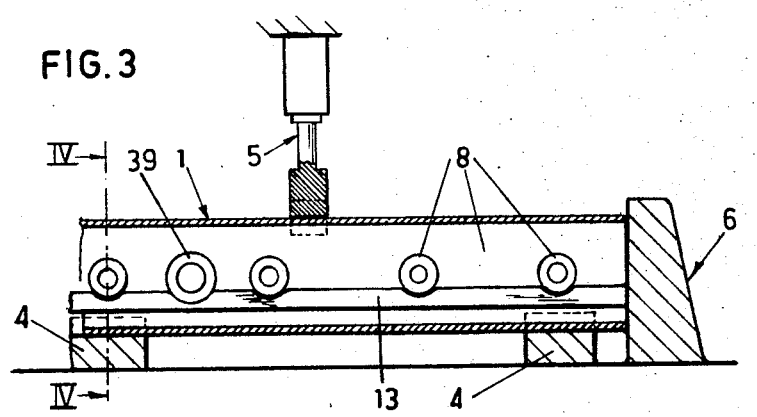
FIG. 3 is a longitudinal section through an apparatus for making an attachment according to the invention.
Figure 4:
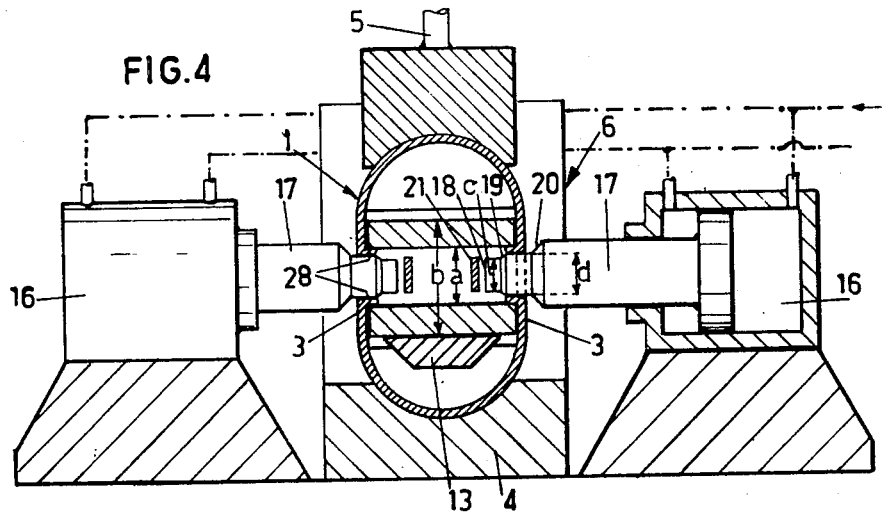
FIG. 4 is a cross section, to an enlarged scale, taken on the line IV—IV in FIG. 3, at a subsequent stage of the method according to the invention.

The apparatus shown in FIGS. 3 and 4 comprises a frame 6 and means for retaining the support 1, said means consisting of supports 4 and a ram 5, a retaining member 13 for receiving bushes 8 and 39, by means of which the bushes, 8, 39 are retained in place when the support 1 is disposed axially on the retaining member 13, and comprising a number of pressing tools 17 which are disposed in pairs opposite the places of attachment at either side of the support 1 and which are simultaneously driven towards or away from one another by rams 16.

At their free ends the press tools 17 have punching tools 18 having a diameter $c$ smaller than the inside diameter $a$ of the bushes 8, 39. Coaxially connected to the punching tools 18 are deforming tools 19, 20. The punching tools 18 punch out discs 21, thus forming apertures 10 in the opposite walls 3. The edges 28 of the walls around the apertures 10 are deformed inwardly into the bushes 8 by the deforming tools 19. The portions of the walls around the apertures 10 are then so deformed by the deforming tools 20 that conical seating surfaces 23 are produced for knobs 24 of the tines 2 to be attached, or pins 56, 57 for for conical nuts 11; 26 to be screwed on to the threaded ends 12. When the edges 28 of the walls around the apertures 10 are deformed, an inside diameter $d$ is produced which is greater than the diameter $c$ of the discs 21, so that after the withdrawal of the press tools 17 the discs 21 can drop out of the bushes 8. The following are examples of the dimensions indicated in the drawings:

$$a = 24, b = 38, c = 19 \text{ and } d = 22 \text{ mm}.$$

The operation pressure of the rams 16 is so great, for instance three times the tightening stress of the tines 2 or pins 56, 57 respectively, that the surface pressure prestress of the surfaces 23 is substantially greater than the surface pressure which can be produced by strong tightening the nuts 11 or 30 respectively.

After the bushes 8 and 39 have been attached in the support 1, when the ram 5 has been withdrawn, the support 1 can be lifted from the retaining member 13 and moved away therefrom.

THe apparatus illustrated in FIGS. 3 and 4 may comprise only one pair of pressing tools 17, in which case the support is moved up, after each attachment of a bush 8 or 39, until there is a subsequent bush 8 or 39 between the pair of pressing tools 17. However, the apparatus preferably comprises the same number of pairs of pressing tools 17 as bushes to be attached.

Figure 5:
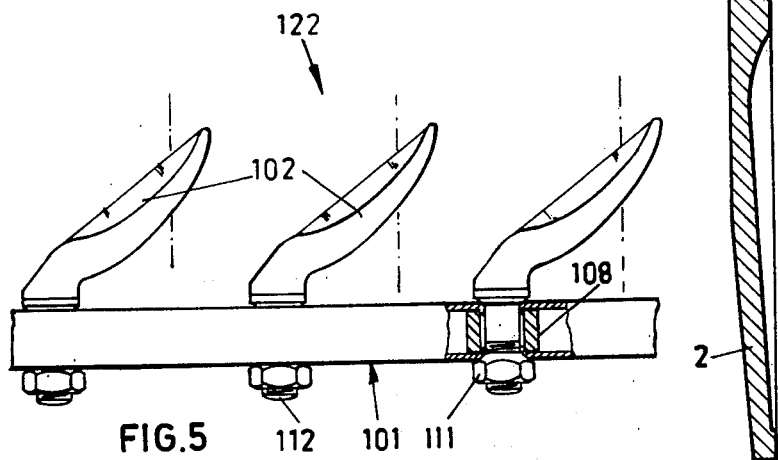
FIG. 5 is a plan view of a comb of ejectors of a digging machine.

Bushes 108 are made in a support 101 of a comb 122 of a digging machine in the same manner as disclosed hereinbefore with reference to a harrow beam 22. The ejectors 102 of the comb 122 are inserted in the bushes and screwed tightly by nuts 111 on to the threaded ends 112 of the ejectors 102 (cf. FIG. 5).

Said digging machine comprises in known manner a rotor with spades (not shown). The object of the comb 122 with ejectors 102 is to knock the clods of dug-out earth off the spades.

In the same way, for instance, the tines of a machine for loading bales of straw can be mounted in the appropriate attaching tube.

What I claim is:

1. Apparatus for attaching at least one projecting member to a hollow support of an agricultural implement, said member extending through an aperture in each of two opposite walls of said support, said apparatus comprising means for retaining at least one bush in place between said two opposite recesses in said hollow support and comprising at least one pair of aligned facing deforming tools for inward deformation of the edges of said two opposite recesses.

2. An apparatus as claimed in claim 1, characterized in that each deforming tool bears aligned with it at its free end a punch tool having a diameter which is smaller than the diameter of the deforming tool.

3. Apparatus as claimed in claim 1, wherein said deforming tools have conical press surfaces.

4. Apparatus as claimed in claim 1, wherein said deforming tools are actuated by actuating means providing a tool pressure which is greater than the maximum tightening stress of a screw-threaded projecting member to be inserted through said apertures.

* * * * *